C. F. WALL AND F. HARKER.
TRIAL SPECTACLE FRAME.
APPLICATION FILED OCT. 21, 1919.
1,380,166. Patented May 31, 1921.
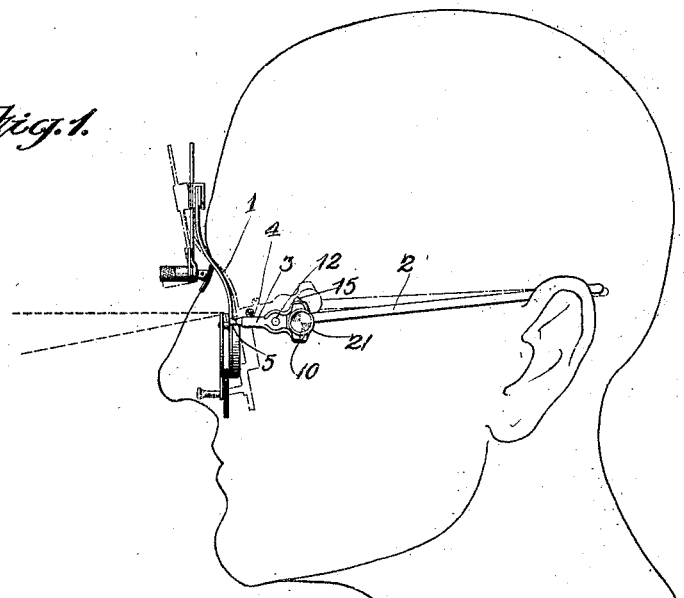
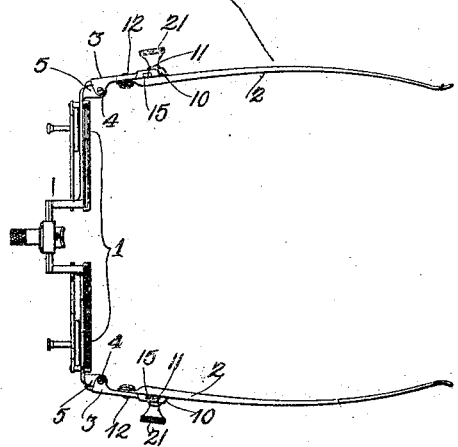
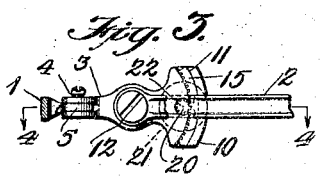 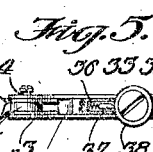 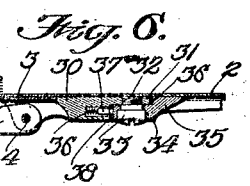
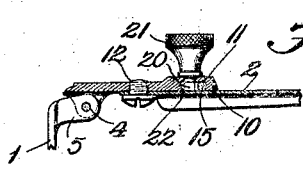

UNITED STATES PATENT OFFICE.

CHARLES F. WALL AND FREDERICK HARKER, OF PHILADELPHIA, PENNSYLVANIA, ASSIGNORS TO WALL & OCHS, INCORPORATED, OF PHILADELPHIA, PENNSYLVANIA, A CORPORATION OF PENNSYLVANIA.

TRIAL SPECTACLE-FRAME.

1,380,166.  Specification of Letters Patent.  Patented May 31, 1921.

Application filed October 21, 1919. Serial No. 332,224.

*To all whom it may concern:*

Be it known that we, CHARLES F. WALL and FREDERICK HARKER, citizens of the United States, and residents of Philadelphia, in the county of Philadelphia and State of Pennsylvania, have invented an Improvement in Trial Spectacle-Frames, of which the following is a specification.

In the trial or testing of lenses to ascertain the refractive power of the lenses required by a patient, oculists and opticians employ trial spectacle frames which are adapted to hold the trial or test lenses as the trials or tests are made. It is frequently desirable that the angularity of the frame with respect to the eyes should be varied so that the trial or test lenses shall occupy the desired angular position as the patient looks through them.

It is the object of this invention to provide means for readily effecting angular adjustments of the trial frame for the purpose above indicated.

A further object is to provide a simple and efficient construction of means for this purpose which will not in any way affect or modify the construction of the lens holding portion of the frame.

In order that the invention may be readily understood and its practical advantages fully appreciated, reference should be had to the accompanying drawing in which we have illustrated two forms of embodiment thereof. However, it is to be understood that the invention may be embodied in other forms of construction than those shown without departing from the scope of the invention as defined by the claims.

In the drawing:

Figure 1 is a view in side elevation of a spectacle frame provided with means embodying our invention for effecting angular adjustment of the said frame with respect to the eyes of a patient, the said frame being shown in position upon the outline of the head and face of a person whose eyes are being tested;

Fig. 2 is a top plan view of the same;

Fig. 3 is a view partly in section, showing the inside of a portion of the temple of the frame provided with the invention;

Fig. 4 is a horizontal sectional view taken on the line 4—4 of Fig. 3;

Fig. 5 is a view similar to that shown in Fig. 3 but showing a modified construction of adjusting means; and Fig. 6 is a horizontal section taken on the line 6—6 of Fig. 5.

Referring to the drawing: 1 designates as a whole the lens holding portion of the frame. Each temple of the frame comprises two parts 2 and 3 which are adapted to be adjustably connected together. By adjusting these parts of the frame angularly with respect to each other, angular adjustment of the lens holding portion 1 of the frame with respect to the eyes or with respect to the general plane of the face of a person is effected.

The front portion 3 of each spectacle frame is pivoted at 4 to lugs 5 at the opposite ends of the lens holding portion of the frame, such pivoting permitting the folding up of the temples in the usual manner.

Referring now to Figs. 1 to 4 inclusive, it will be noted that the rear end portion of each of the parts 3 is widened out to form an elongated head portion 10 which is provided upon its inner side with an arcuate slot 11. The forward end of the part 2 of each of the temples is pivoted at 12 upon the inside of the part 3 at a point a distance in front of the arcuate slot 11, so that as the parts 2 and 3 are adjusted with relation to each other, the portion of the part 2 adjacent its pivot swings over the inner face of the head portion 10 of the part 3. The part 2 is provided with an arcuate shaped rack member 15 which is situated in the arcuate shaped slot 11. In order to readily effect sliding movement of the arcuate shaped rack member 15 and consequent angular adjustment of the members 2 and 3 with respect to each other, we have provided a pinion 20 which is secured upon the inner end of an adjusting thumb or finger piece 21 which projects outwardly from each of the members 3. The pinion 20 is located in a cylindrical recess 22 formed in the member 3 and which opens into the arcuate slot 11. The said pinion projects through said opening so that its teeth engage the teeth upon the rack 15, as shown in Figs. 3 and 4. By turning the adjusting thumb or finger piece 21, rotation of the pinion 20 is effected, which in turn causes relative sliding movement between the rack 15 and the slot 11 in which it is situated.

Assuming that the frame is in position upon a patient as indicated in Fig. 1, and further assuming that the rear end of the members 2 of the temples are retained against the ears as shown in said figure and further assuming that the pinions 20 are turned so as to elevate the rear ends of the members 3 of the temple with respect to the forward ends of the members 2 thereof, the portion 1 of the trial frame would be tilted forward. If, however, the pinions were turned so as to cause angular adjustment in the opposite direction, the said frame portion 1 would be tilted in the opposite direction, that is,—toward the face or eyes of the patient.

In Figs. 5 and 6 of the drawing we have shown a modification of the construction in which the rear portion of the member 3 of the temple is provided with a block 30 having a rearwardly extending portion 31 of reduced thickness which is provided with a screw threaded opening 32 for the reception of a binding screw 33 which extends through an opening 34 in a block 35 secured upon the inner side of the front end portion of the member 2. The outer side of the block 35 is provided with a cut out or rabbeted portion as indicated at 36, in which the portion 31 of the block 30 is seated. The inner portion of the block 35 overlies the portion 31 of the block 30. The latter block is provided with an opening 36ª in which is situated a spring pressed plunger 37, the outer rear end of which is adapted to engage or press against the circular edge of the forward end of the block 35 which is serrated, as is indicated at 38. It will be seen that the spring pressed plunger 37 being yielding permits relative angular adjustment in vertical planes (having reference to the temples when in place upon a patient as shown in Fig. 1) of the parts 2 and 3 with respect to each other so as to effect or cause angular adjustment of the said parts with respect to each other and consequent angular adjustment of the portion 1 of the trial frame structure with respect to the eyes or face of the patient.

By angularly adjusting the members 2 and 3 with respect to each other, the top portion 1 of the trial frame structure may be tilted toward or from the eyes, that is,— toward or from the upper portion of the face of the patient, as may be desired. Such adjustment may be desirable in order to bring the lenses into proper or desired relation with respect to the eyes of the patient under examination.

We claim:

1. A trial spectacle frame comprising lens holding portions and temple portions, the said temples being pivotally connected with the said lens holding portion of the frame whereby the said temples may be folded inwardly, and each of the said temples comprising front and rear members, the rear end portion of the front member overlying the front end portion of the rear member, means for pivotally connecting the said members together, the said front member being provided with an arcuate slot, a pinion pivotally mounted upon said front member and projecting into the said slot, and an arcuate rack member secured upon the said rear member of the temple, said rack member being situated in the said arcuate slot and being engaged by the said pinion whereby angular adjustment of the said front and rear members of the temples may be effected to cause tilting movements of the lens holding frame portion with respect to the face of the patient.

2. A trial spectacle frame comprising a portion for holding the lenses and temple portions pivoted to the said lens holding portion whereby said temple portions may be folded inwardly over said lens holding portion of the frame, and the said temple portions each comprising a front member having an elongated vertically arranged portion at its rear end provided with an arcuate slot upon the inner side thereof, and the front end portion of the rear member being situated inside of the rear end portion of the said front member and being pivoted thereto, and interlocking means between the said members for effecting angular adjustment of the same with respect to each other.

3. A trial spectacle frame including a lens holding portion and temple portions, the said temple portions comprising a front member and a rear member, the said front member being provided with a vertically extending elongated head portion at its rear end, said portion having an arcuate slot upon its inner side, also a recess adjacent and opening into said slot, and the front end of the said rear member overlapping the inner side of the rear end portion of said front member and being pivoted to the latter, the overlapping portion of the said rear member being provided with an arcuate rack situated in the said arcuate slot, and a pinion situated in the said recess and being in engagement with the said rack to effect relative adjustment between the said members.

4. A trial spectacle frame comprising temples, each temple including front and rear parts, a gear connected to one of said parts, and a rack carried by the other of said parts, the said gear being in engagement with the said rack whereby upon rotation of the said gear angular adjustment between the said parts is effected.

5. A trial spectacle frame comprising temples, each temple including two parts pivotally connected together, one of said parts having a projection extending beyond the point of pivotal connection of the two parts, a pinion carried by said projection and an arcuate rack concentric with the said connection, said pinion being in engagement with said rack.

6. A trial spectacle frame including temples, the said temples having pivotal connection with the opposite end portions of the said frame and each temple including two parts, the front end of the rear part of each temple being connected to the other part of said temple at a point in front of the rear end thereof, a pinion carried by the rear end portion of the front part of each temple, and an arcuate rack secured to the front end portion of the rear part of each temple in concentric relation to the pivot connection between the front and rear parts, and the said pinion being in engagement with the said rack.

7. A temple for trial spectacle frames comprising a front member having adjacent its rear end a slot in one side thereof, a rear member pivoted to said front member at a point in front of said slot and having an arc-shaped rack which is situated in said slot, and a pinion carried by said front member and projecting into said slot and being in engagement with said rack whereby, upon rotation of said pinion, relative angular adjustment of said members is effected.

In testimony that we claim the foregoing as our invention, we have hereunto signed our names this 14th day of October A. D., 1919.

CHARLES F. WALL.
FREDERICK HARKER.